United States Patent

[11] 3,587,312

| [72] | Inventors | Charles L. McMurtrie<br>North Plainfield;<br>Alan E. Rodely, Scotch Plains, N.J. |
|---|---|---|
| [21] | Appl. No. | 786,615 |
| [22] | Filed | Dec. 24, 1968 |
| [45] | Patented | June 28, 1971 |
| [73] | Assignee | Eastech, Inc., Watchung, N.J. |

[54] DIFFERENTIAL SENSOR BLUFF BODY FLOWMETER
9 Claims, 5 Drawing Figs.

| [52] | U.S. Cl. | 73/204,<br>73/194 |
|---|---|---|
| [51] | Int. Cl. | G01p 5/10,<br>G01p 5/00 |
| [50] | Field of Search | 73/194, 209 |

[56] References Cited
UNITED STATES PATENTS

| 3,116,639 | 1/1964 | Bird | 73/194 |
|---|---|---|---|
| 3,434,344 | 3/1969 | Brunner | 73/194 |

FOREIGN PATENTS

| 150,656 | 12/1962 | U.S.S.R. | 73/194 |

*Primary Examiner*—Richard C. Queisser
*Assistant Examiner*—John K. Lunsford
*Attorney*—Frederick W. Padden ABSTRACT: A flowmeter bluff body arrangement is disclosed with differential sensor apparatus mounted on a base surface of the body which faces an incoming fluid flow. Electrically heated sensors are provided with ceramic materials which isolate heatable grid elements from physical contact with the fluid. Circuitry is disclosed for translating sensed oscillatory flow signals into indications of flow rate through a pipeline.

PATENTED JUN 28 1971  3,587,312

INVENTORS: CHARLES L. MC MURTRIE
ALAN E. RODELY

BY Frederick W. Padden
ATTORNEY

DIFFERENTIAL SENSOR BLUFF BODY FLOWMETER

This invention relates to flowmetering equipment and particularly to differential sensing devices utilized with a bluff body mounted within a conduit for producing in a flowing fluid oscillating signals which vary in frequency in accordance with the flow. Our invention further relates to a sensor arrangement integral with the bluff body and to electronic signal processing facilities that enable the frequency of the signals to be measured accurately despite the presence of flow noise and electrical noise.

The development of metering instruments has progressed in recent years to the extent that devices are presently available for generating a strong oscillatory motion, from intermittency, in a fluid flow-through a pipeline and for converting the oscillation into an electrical signal for measurement of its frequency which is related to the volumetric flowrate. U.S. Pat. application Ser. No. 732,238 of A. E. Rodely, titled "Bluff Body Flowmeter" describes a series of bluff bodies that produce strong, regular oscillations and teaches that the high signal-to-noise ratios are obtained with sensors positioned so as to detect the signals outside of a wake generated by the bluff body. The patent application shows in FIG. 7 a sensor mounted through an opening in the wall of the pipe to detect the signal in the periodic, low turbulence flow zone outside of the wake.

It has been a prior art problem to obtain access to the sensor and the bluff body housed in the pipeline for cleaning and inspection purposes. Such cleaning has been found desirable because excessive accumulations of dirt or solids thereon impair the performance of the sensor by reducing its sensitivity and changing the calibration of the meter by altering the effective shape of the bluff body. This removable feature of the sensor and bluff body from the housing is particularly desirable when the meter is to be used to measure fluid streams which are dirty or contain appreciable amounts of solids.

In instances where pulsations are present in the flow stream to be measured, it has been a problem to provide simple and compact sensor arrangements positioned so as to detect the oscillatory signals in an out-of-phase relationship and the pulsations in an in-phase relationship for advantageously canceling the undesirable pulsation components and enhancing the signal for the determination of signal frequency to yield a more accurate flowrate measurement.

The need for such sensor arrangements and the requirement that sensors and bluff body be made removable makes it necessary to provide a multitude of separate access holes in the wall of the pipe each with its own bolting and sealing arrangement. This is both costly to make and service as well as inconvenient to use.

A typical probelike sensor of the type suggested by the above-identified patent application would be a velocity-sensitive device in the form of a self-heated resistance element, such as a bead thermistor. These devices are frequently small in size in relation to the size of the random flow disturbances (turbulent noise) that accompany the regular oscillatory motion which is the signal. The effect of the small size sensor is to limit the magnitude of the signal-to-noise ratio and to impair the measurement reliability. Another typical probelike sensor is a pressure transducer with its sensitive surface connected to the point at which the signal is to be detected by a known arrangement of a signal-transmitting tube. When it is desired to make use of such sensors, in a diametrically opposed relationship, to cancel out unwanted pulsation effects, an economy may be effected by using one, differential pressure transducer and connecting it to the diametrically opposed points by signal-transmitting tubes. A difficulty arises however because these tubes have to be made long enough, in combination, to reach from one side of the pipe to the other. Moreover, the longer such tubes are the more likely is the possibility that the first resonant mode of the tubes (acting like organ pipes) will occur at a frequency within the range of flowmeter signal frequencies. When this happens the tubes effective emphasize the turbulent noise which accompanies the signal and the differential transducer at the end of the tubes receives a signal of reduced signal-to-noise ratio. Cases have occurred where because of this effect, the flowmeter signal was actually overwhelmed by the tube resonance effect and a completely erroneous indication of flowrate was obtained.

Another disadvantage of the probelike sensor is the fragility of a device which has to project into the flow stream. It has been found that the sensitive tips of these sensors can be damaged by mishandling or broken by the impact of solids in the flow stream.

In view of the foregoing, it is apparent that a need exists for facilities which reduce the cost and complexity of bluff body flowmeters while providing for accurate measurement of flow through a conduit. A further need exists for bluff body devices which provide for the generation and detection of oscillating flow signals with high signal-to-noise ratios and consequent improved reliability and accuracy, particularly when measuring dirty and noisy flow streams.

The foregoing and other needs are fulfilled in accordance with specific illustrative embodiments of our invention which are more fully understood from a reading of the following description thereof with reference to the drawing in which.

Figure 1A:
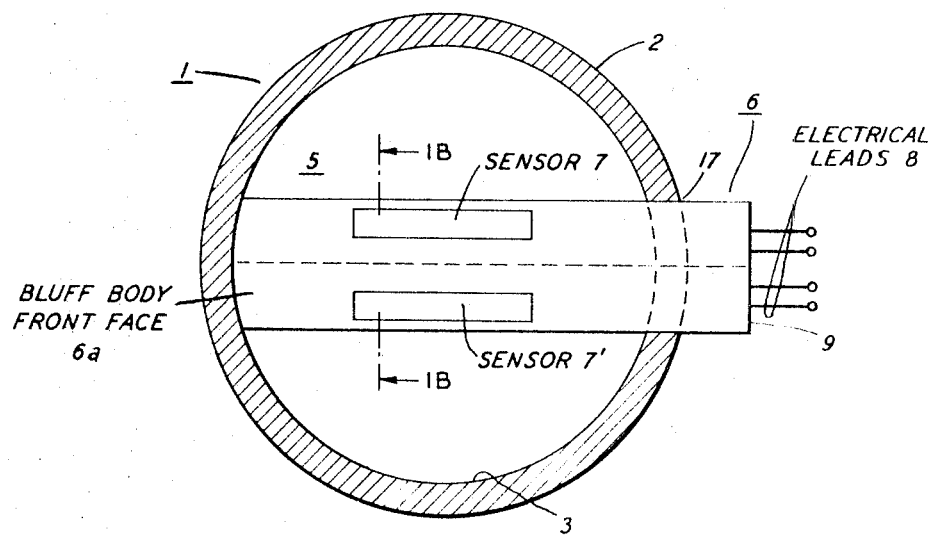
FIG. 1A shows the front face of a bluff body mounted in a pipeline with sensors mounted thereon and electrical leads from the sensors passing out through the end of the bluff body in accordance with our invention.
Figure 1B:
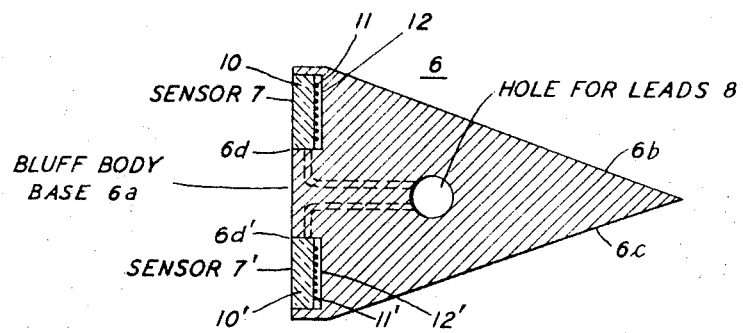
FIG. 1B is a section through the bluff body showing the placement of the sensors in accordance with our invention.

Referring now to FIG. 1A, there is shown an integral arrangement of sensors 7 and 7' and bluff body 6 wherein sensors 7 and 7' are mounted on the facing surface of the base 6A of body 6. FIG. 1A also shows a section of a conduit pipe 1 defined by a circular wall member with an outer surface 2 and an inner surface 3 which forms a hollow inner cylindrical chamber 5 for the flow of fluid therethrough. The bluff body 6 with dimensional shape and geometry as described in aforementioned patent application, which is incorporated herein by reference as fully disclosed herein. The body 6 is advantageously shown with its base facing forward and preferably normal to an incoming fluid flow. Body 6 is advantageously removably mounted through an aperture 17 through the pipeline 1 as shown in FIG. 1A. A preferred arrangement of two sensors 7 and 7' is shown, the sensors being mounted flush with the base surface 6A. FIG. 1B is a cross section view of the bluff body 6 showing the mounting of the sensors in more detail, and also show means for passing electrical leads 8 from each of the sensors to an aperture 9 in body 6 which communicates to terminals outside the conduit in which the bluff body placed.

The sensors 7 and 7' are operated in a differential manner in order to increase the amplitude of the oscillatory signal while at the same time to decrease the amplitude of in-phase, unwanted signals due to flow turbulence and sound waves which may be present in the conduit system. Thus, operating two sensors in a differential manner provides an output with high signal-to-noise ratio.

Figure 1C:
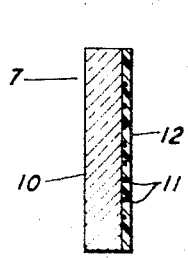
FIGS. 1C and 1D show a section and rear view through an exemplary sensor assembly.
Figure 1D:
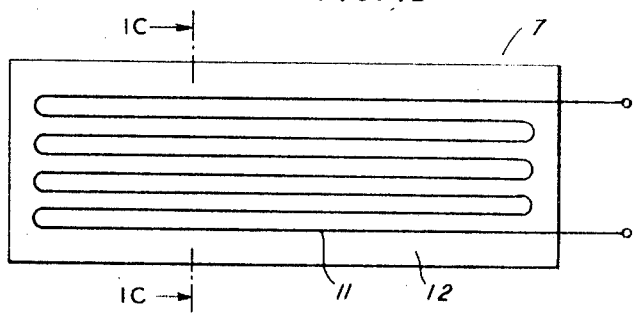

The sensor is selectively responsive to temperature, pressure, or velocity variations associated with the oscillatory flow. A preferred sensor arrangement is shown in FIGS. 1C and 1D where the sensor is of the electrical resistance grid 11 mounted or affixed on the rearward portion of a ceramic window material 10. The grid is heated in a known manner by external means to a temperature above that of the flowing fluid so as to be sensitive to velocity variations associated with the oscillatory flow. In order to achieve the quality of ruggedness, the heated grid 11 is cemented to a chip of ceramic material 10, and the latter is exposed to the flowing fluid. Material 10 for example is constituted or beryllium oxide, which has the characteristic of conducting heat very readily while at the same time being an excellent electrical insulator. Thus the sensitive wire grid 11 is protected by a very hard, corrosion and erosionaresistant material 11 which does not thermally insulate the heated element.

We have found it advantageous to place the sensors on the base 6A of the body 6 in the illustrated manner of FIGS. 1A and 1B. There each sensor is shown mounted parallel to and close to a respective opposite edge of the bluff body base 6A, so that a line drawn longitudinally along the middle of a sensor is closer to the edge than to the bluff body axis. As mentioned previously, means are provided internal to the bluff body for passing electrical conductors 8 from each sensor to terminals outside the conduit.

Referring to FIGS. 1A and 1B, the geometry of the sensor is relatively long and narrow, such that the sensor length is an appreciable fraction of the length of the bluff body face. This geometry is advantageous from the point of view of averaging out undesired signals due to flow turbulence.

Referring now specifically to the case of a single pressure sensor operating differentially from known signal-transmitting tubes (not shown) placed on the face of the bluff body, an advantage may be seen in that the length of signal-transmitting tubes can readily be made very much smaller than would be the case for a prior art differential pressure sensor mounted outside the conduit and connected to tubes which terminate at diametrically opposed points of the conduit. It is practical, in accordance with our invention, to place the entire pressure sensor device inside the bluff body wherein the pressure oscillations are converted into electrical signals, thus to achieve very short lengths for the signal-transmitting tubes.

It is also evident from our teaching that, for the case of a single, differential pressure sensor mounted outside the conduit and connected to signal-transmitting tubes which terminate on the bluff body base, the length of such signal-transmitting tubes can be made relatively small.

Finally, it should be evident that although the preceding remarks referred to the specific use of a single, differential pressure sensor, such remarks are also applicable to arrangements where two pressure sensors are used, operating individually from signal-transmitting tubes, but being connected so as to give a single, differential output.

Figure 2:
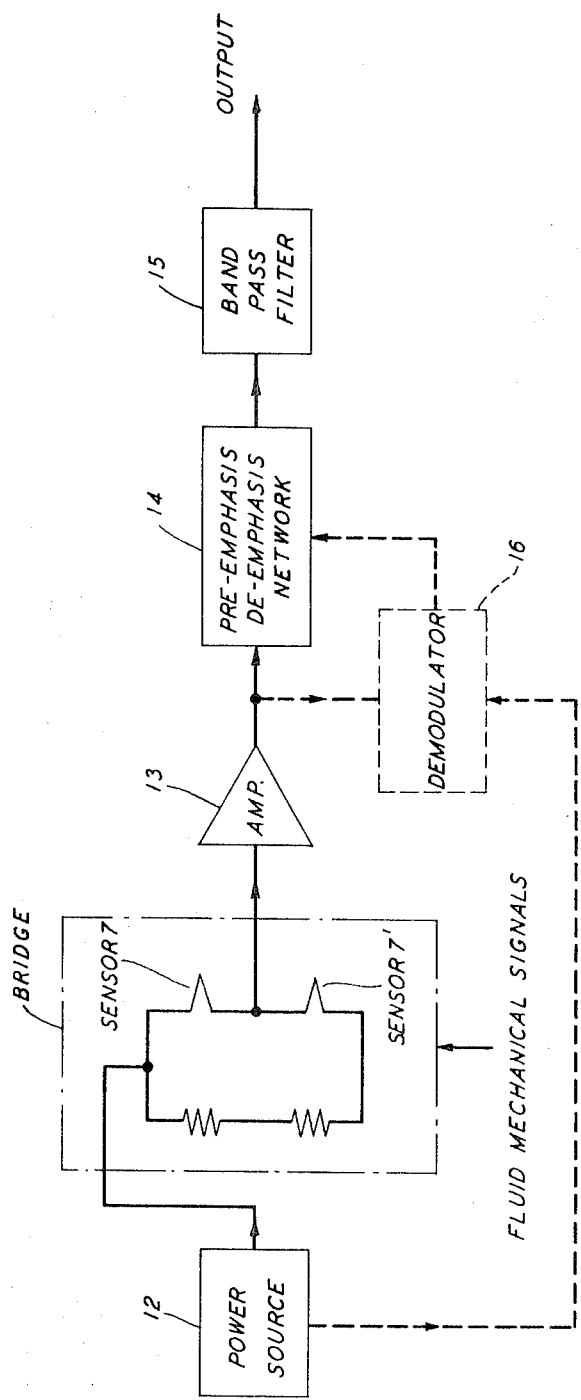
FIG. 2 shows an a arrangement of electronic components which are used for translating the sensed flow signals into an electrical indication of flow.

A block diagram is shown in FIG. 2 of the translating circuitry used to produce an output signal that is readily measured from the sensors described previously.

Referring to FIG. 2, the sensors are energized from a regulated electrical source of power 12. The fluid mechanical signal acting within this pipeline 1 upon the sensors 7 and 7' cause a corresponding change in one or more of the sensors electrical parameters for producing an electrical signal which is amplified by amplifier 13. The signal is translated by a preemphasis/deemphasis frequency versus amplitude compensation network 14 whose frequency response characteristics are chosen to be the inverse of the sensors frequency response. The signal is passed through a filter 15 to remove predetermined broad band turbulent and electrical noise that accompanies the signal.

The electrical circuitry in each of the blocks shown in FIG. 2 is dependent upon what type of sensor elements are employed. For example, in the case of heated sensor elements 7 and 7' such as wire or film grids or thermistors, the sensor power source 1 is desirably a source of DC power. On the other hand, if the sensors 7 and 7' are variable reluctance type pressure transducers, they are energized by an AC source. In this latter case, a demodulator 6 is selectively added to remove the AC carrier signal. The fluid mechanical signal generated by a bluff body type flowmeter is detectable by a heated grid type sensor such as those described previously by utilizing the laws of convective heat transfer. The heating of such a sensor and its placement in a flow stream causes its resultant temperature to be dependent upon the amount of power or heat input to the sensor and the amount of heat extracted from the sensor by convection as well as by radiation and conduction. Changes in the velocity of the flow stream causes the temperature to be altered as determined by the laws of thermodynamics. In the bluff body type flowmeter the local fluid oscillations produce a velocity variation that is detectable by such a heated grid type sensor.

Illustratively, the two sensors 7 and 7' are connectable in a bridge configuration which is powered by an electrical source of power 12. The sensors are arranged physically so that the fluid mechanical signals are 180° out of phase so that as one sensor temperature is increasing the other sensor temperature is decreasing. Since the electrical resistance of each sensor is a function of its temperature the output from the bridge is an electrical signal which is a function of the fluid dynamic signal. The electrical signal from the bridge is amplified by amplifier 13, passed through a preemphasis network 14 and a band-pass filter 15 before being presented as an output signal. The preemphasis network 14 is utilized because the frequency response of the heated grid sensor is found to be not flat particularly when used to measure gas flows.

It is to be understood that the hereinbefore described arrangements are illustrative of the application of the principles of our invention. To elaborate, our invention teaches differential sensor arrangements cooperating with and forming an integral part of bluff body 6 to provide an oscillatory, nonintermittent fluid flow. The body 6 together with sensors 7 and 7' are removably mounted through an aperture 9 in a circular pipeline 1 having a hollow inner cylindrical chamber 5 for the flow of fluid therethrough. For flow measurements, the body is mounted in a stationary position in chamber 5 along its diameter transverse and normal to its longitudinal axis. Advantageously, body 6 comprises a cross-sectional shape of an isosceles triangle with the base 6a with its surface facing forward and preferably normal to an incoming fluid flow toward body 6. The body 6 comprises side members, or downstream surfaces 6b and 6c of equal length. The ratio of the axial length of body 6 to the height of its base 6a is importantly between 1 and 2. The ratio of the height of base 6a to the inner diameter of pipe 1 is between 0.15 and 0.4. As shown in FIG. 1, each sensor 7 and 7' is mounted within a respective individual cavity recess 6d and 6d' of base surface 6a with ceramic materials 10 and 10' facing the incoming fluid flow toward body 6 and isolating the respective grid elements 11 and 11' from physical contact with the fluid flow. The materials 10 and 10' transmit thermal environmental conditions of the fluid flow to the grid elements for sensing of the flow rate. An epoxy material 12 and 12' is molded about the grid elements 11 and 11' to insulate them from body 6. It is therefore apparent that numerous arrangements, other than those specifically described, may be devised by those skilled in the art without departing from the spirit and scope of our invention.

We claim:

1. For use in a flowmeter, a bluff body mountable in a stationary position within a hollow inner chamber of a conduit transverse to a longitudinal axis of said chamber, said body comprising a first surface facing said fluid flow and having a height dimension and second surfaces extending downstream from said first surface and having an axial dimension with the ratio of said axial dimension to said height dimension being within the limits of 1 and 2, said surfaces interacting with fluid flow through said chamber to produce an oscillating fluid flow free of intermittency and of a frequency corresponding to the flow rate, and means forming an exterior portion of said first surface to interact with said oscillating fluid flow and including means for sensing said oscillating fluid flow.

2. The invention defined in claim 1 wherein said sensing means comprises means for differently sensing said oscillating fluid flow.

3. The invention defined in claim 2 wherein said forming means comprises a first and a second device each of which forms a respective individual part of said first surface facing said fluid flow toward said body, said differentially sensing elements comprise a pair of sensors each of which is cooperatively arranged with an individual one of said first and second devices for said differential sensing of said oscillating fluid flow free of intermittency.

4. The invention defined in claim 3 wherein each of said first and second sensing elements comprises an electrical device heatable for sensing said oscillating fluid flow, and each of said first and second device comprises a thermally noninsulating material.

5. The invention defined in claim 4 wherein each of said first and second devices comprises a ceramic material, each of said first and second sensing elements comprises an electrically heatable grid element, and further comprising means joining each said grid element to a respectively individual one of said ceramic material devices.

6. The invention defined in claim 5 wherein said first surface of said body comprises a pair of cavities, each one of which mountably receives an individual one of said joined grid element and said ceramic material device with said latter device facing said fluid flow toward said bluff body and said latter grid element being within said one cavity for precluding physical contact with said fluid flow.

7. The invention defined in claim 6 wherein each said grid element is molded in a material which thermally insulates said elements from said bluff body, and said body further includes internal passage means for electrical connection of said grid element to external means.

8. In combination, a conduit having means defining a hollow inner chamber containing a flowing fluid, said chamber having a longitudinal axis and a diameter dimension, a stationary bluff body positioned within said chamber transverse to said longitudinal axis thereof and interacting with said flowing fluid to produce an oscillating fluid flow which is free of intermittency and of a frequency corresponding to the flow rate and which is outside of an oscillating wake generated by the interaction of said flowing fluid and said body, said body comprising a first surface facing said fluid flow and having a height dimension and second surfaces extending downstream from said first surface and having an axial dimension with the ratio of said axial dimension to said height dimension being within the limits of 1 and 2 and with the ratio of said height dimension of said first surface to said diameter dimension of said chamber being between the limits of 0.15 and 0.4, differential sensor means including a pair of sensors each of which is mounted within recess areas of said first surface of said body and comprises an electrically heatable grid element joined to a window material which isolates said said element from physical contact with said fluid flow and which transmits thermal environmental conditions of said fluid to said grid element with said latter element being molded in a material which insulates it from said body, said sensors being mounted parallel and proximate to respective opposite edges of said first surface of said body, said body further comprises passage means for electrically connecting conductors to said grid elements, an electrical resistance bridge including said grid elements and said conductors, means supplying electrical power to said bridge for heating said grid elements for differential sensing of said oscillating fluid flow, and said grid elements being effective for sensing flow thermal conditions transmitted through said window materials to produce representative electrical flow rate signals.

9. The combination in accordance with claim 8 further comprising means responsive to the receipt of said electrical signals for providing output signals with amplitude versus frequency emphasis, and means filtering certain frequencies in said output signals to provide indications of said fluid flow rate through said chamber.

UNITED STATES PATENT OFFICE
CERTIFICATE OF CORRECTION

Patent No. 3,587,312                      Dated June 28, 1971

Inventor(s) Charles L. McMurtrie and Alan E. Rodely

It is certified that error appears in the above-identified patent and that said Letters Patent are hereby corrected as shown below:

In the specification, column 1, line 13, after the comma, first occurrence and before "from", the word "free" should appear. Column 1, line 72, the word "effective" should be --effectively--. Column 3, line 2, "erosionaresistant" should read --erosion resistant--. Column 4, line 54, before "fluid", the word "said" should be --a--; line 66, the word "differently" should be --differentially--. Column 4, lines 71 and 72, the word "elements" should read --means--. Column 5, lines 2 and 8 the words "first and second sensing elements" should read --sensors--. Column 6, line 11, before "said" cancel "said", first occurrence.

Signed and sealed this 15th day of February 1972.

(SEAL)
Attest:

EDWARD M. FLETCHER, JR.                ROBERT GOTTSCHALK
Attesting Officer                       Commissioner of Patents